United States Patent [19]

Liao et al.

[11] Patent Number: 5,108,622

[45] Date of Patent: Apr. 28, 1992

[54] BLOCK COPOLYMERS FOR SLUDE DEWATERING AND A POLYMERIC INITIATOR FOR THEIR PREPARATION

[75] Inventors: Wen P. Liao, Warminster; Fu Chen, Newtown, both of Pa.

[73] Assignee: Betz Laboratories, Inc., Trevose, Pa.

[21] Appl. No.: 714,101

[22] Filed: Jun. 11, 1991

Related U.S. Application Data

[63] Continuation of Ser. No. 643,686, Jan. 18, 1991, abandoned, which is a continuation of Ser. No. 570,257, Aug. 20, 1990, abandoned.

[51] Int. Cl.$^5$ ................................................ C02F 1/56
[52] U.S. Cl. .................................... 210/734; 210/733; 210/732
[58] Field of Search ............... 210/734, 733, 732, 609; 525/294, 298

[56] References Cited

U.S. PATENT DOCUMENTS

| | | | |
|---|---|---|---|
| 3,900,338 | 8/1975 | Rumpf | 210/734 X |
| 3,993,712 | 11/1976 | Guilbault | 210/734 X |
| 4,169,848 | 10/1979 | Komai et al. | 260/453 RZ |
| 4,283,512 | 8/1981 | Matsushima et al. | 525/438 |
| 4,540,498 | 9/1985 | Wu | 525/294 X |
| 4,604,425 | 8/1986 | Ohmura et al. | 525/88 |
| 4,698,388 | 10/1987 | Ohmura et al. | 525/88 |
| 4,720,346 | 1/1988 | Flesher | 210/734 |

OTHER PUBLICATIONS

Oppenheimer et al., Die Angrew Makromole, Chemie 98, 1981, pp. 167-184.
Piirma et al., Journal of Applied Polymer Science, vol. 24, (1979), pp. 2051-2070.

*Primary Examiner*—Joseph L. Schofer
*Assistant Examiner*—M. Nagumo
*Attorney, Agent, or Firm*—Alexander D. Ricci; Gregory M. Hill

[57] ABSTRACT

The invention pertains to the composition of a novel polymeric initiator and method for initiating the polymerization of vinyl monomers into water soluble polymers or block copolymers. The polymeric initiator has the formula:

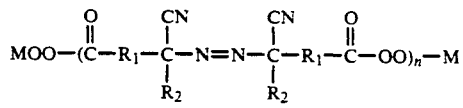

wherein M is H or a cation, $R_1$ is a linear or branched lower alkylene group having from about 1 to 8 carbon atoms, $R_2$ is H or a lower alkyl group having from about 1 to 5 carbon atoms and n is from 1 to 10. The resulting water soluble block copolymers are very useful in sludge dewatering applications.

4 Claims, 2 Drawing Sheets

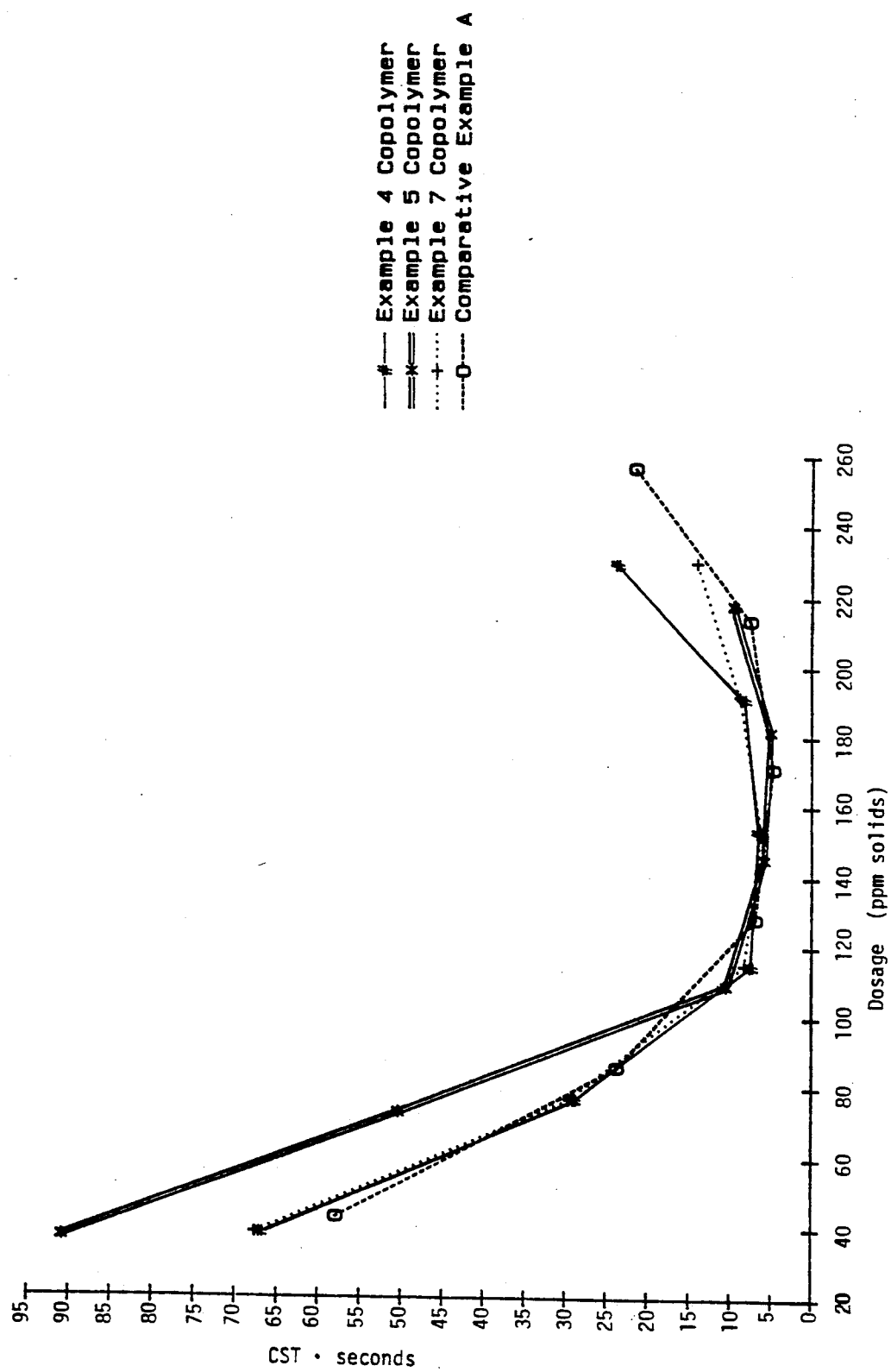

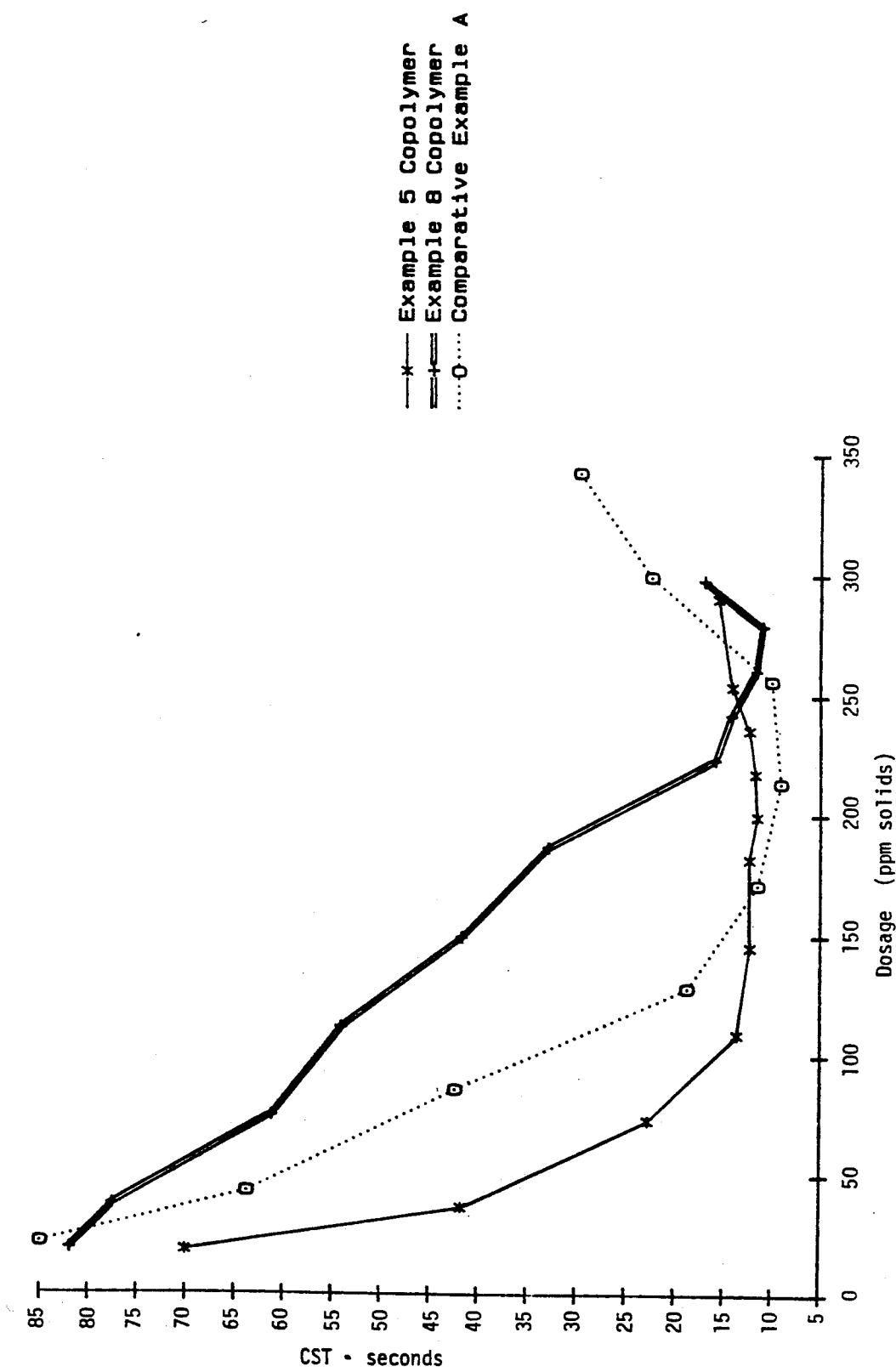

BLOCK COPOLYMERS FOR SLUDE DEWATERING AND A POLYMERIC INITIATOR FOR THEIR PREPARATION

This is a continuation of application Ser. No. 07/643,686 filed Jan. 18, 1991, which is a continuation of Ser. No. 07/570,257 filed Aug. 20, 1990, all now abandoned.

FIELD OF THE INVENTION

The present invention pertains to the utilization of a novel polymeric initiator to polymerize vinyl monomers into water soluble polymers for water treatment applications.

BACKGROUND OF THE INVENTION

Compounds that are capable of generating free radicals by thermal, photochemical, or redox decomposition are used as initiators in polymerization of vinyl monomers. Many commercially available initiators, including various kinds of peroxides, persulfates, and azos are used to produce a large quantity of polymers and copolymers. In most cases these initiators yield random copolymers when used to initiate copolymerization of two (or more) different monomers. As described in the Textbook of Polymer Science by Billmeyer (John Wiley & Sons, 1984, pages 120-121): "Methods of synthesis of polymers containing long sequences (particular monomeric repeating units) are of interest, since they may lead to polymers with properties widely different from those of either homopolymers or random copolymers."

Polymers with long sequences of two monomers can be categorized as block copolymers or graft copolymers. In block copolymers the sequences follow one another along the main polymer chain, —AABB—BBAA—AABB—, etc.

Block copolymers have unique and highly desirable properties as compared to random copolymers or the blend of two homopolymers. Therefore, there is a great interest in preparing them. Few techniques described in the literature satisfy the need.

In this invention, a new type of initiator, characteristic of polymers capable of initiating polymerization via a radical type mechanism is disclosed. This polymeric initiator can be used to prepare block and other types of polymers which cannot be readily prepared using conventional initiators. The polymeric initiator containing more than one initiating group can be partially decomposed to initiate one monomer to give a still reactive prepolymer which can further initiate polymerization of another monomer by decomposing the remaining initiating group to afford a block copolymer. Similarly, a multiblock copolymer can be prepared if the polymeric initiator is homolytically cleaved in the presence of several monomers added sequentially.

Furthermore, with ever increasing usages of water soluble polymers and co-polymers in industries such as wastewater treatment, cooling, boiler and deposit control, coating, textile, mining, detergency, cosmetics, and paper, etc., there is an urgent need to synthesize novel water soluble block copolymers for this broad range of applications.

It is thus an object of this invention to synthesize a novel polymeric initiator that is capable of initiating polymerization of vinyl monomers into water soluble polymers or copolymers.

It is a further object of this invention to prepare distinctive water soluble polymers or copolymers for water treatment applications.

DESCRIPTION OF THE PRIOR ART

Oppenheimer et. al., describe in Die Angrew. Makromole. Chemie 98, pp. 167-184 (1981) the use of a polyazoester-type initiator to prepare poly(methyl methacrylate) which contains a polystyrene segment. The resulting polymer is not water soluble.

U.S. Pat. Nos. 4,698,388, 4,604,425, 4,283,518 and 4,169,848 disclose a diacyl type of polymeric peroxide to be used as a polymerization initiator in producing block copolymers. The free radicals that initiate polymerization or copolymerization are generated from the decomposition of the peroxy groups in the polymeric initiator. It has a different composition and is not as versatile as the polymeric initiator of the present invention.

Piirma et. al., Journal of Applied Polymer Science, Vol. 24, pp. 2051-2070 (1979) describe the use of a difunctional initiator, di-t-butyl 4,4'-azobis(4-cyanoperoxyvalerate) to synthesize styrene and methyl methacrylate block copolymers. Their initiator is not in a polymeric form.

The difunctional and polymeric initiators described in the prior art are used to prepare water insoluble polymers such as copolymers of styrene and methyl methacrylate, copolymers of styrene and ethylene or other olefinic compounds, etc. None is used to prepare water soluble polymers for water treatment as disclosed in this invention. To our knowledge, the present invention involves the first time that the specific polymeric initiator has been synthesized and used to prepare water soluble homopolymers and block copolymers for water treatment.

DETAILED DESCRIPTION OF THE INVENTION

In accordance with the invention, a novel polymeric initiator capable of initiating polymerization, as shown in Formula I hereinafter, is disclosed. The polymeric initiator of the invention has the general formula:

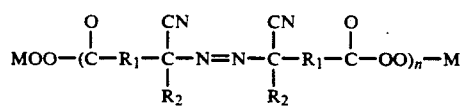

wherein M in the above formula is hydrogen or a cation; $R_1$ is a linear or branched lower alkylene group having from about 1 to 8 carbon atoms; $R_2$ is hydrogen or a lower alkyl group having from about 1 to 5 carbon atoms; n is from 1 to 10.

The preferred polymeric initiator in this invention has the formula:

FORMULA II

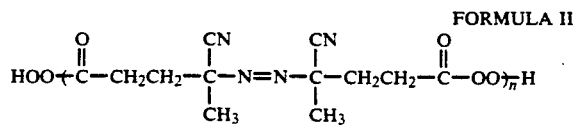

wherein n is about 1-4.

The polymeric initiator in Formula II is prepared via a two-step procedure. First, 4,4'-azobis(4-cyanopentanoic acid) (ACPA) is converted to its acid chloride form, 4,4'-azobis(4-cyanopentanoylchloride) (ACPC) in accordance with the equation:

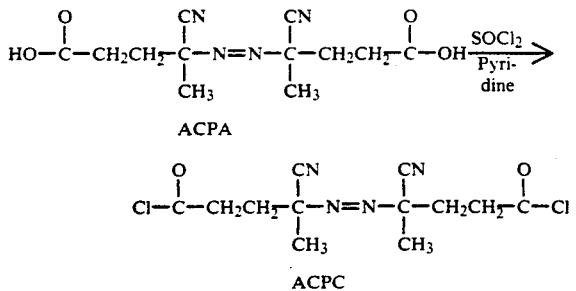

ACPA

ACPC

The conversion of the carboxylic acid to the acid chloride is verified by carbon 13 NMR (Table I) and FTIR (1795 cm$^{-1}$ for

After isolation and purification, ACPC is then reacted with hydrogen peroxide via an interfacial polycondensation reaction to form poly[4,4'-azobis (4-cyanopentanoyl peroxide)](polyACPP), according to the equation:

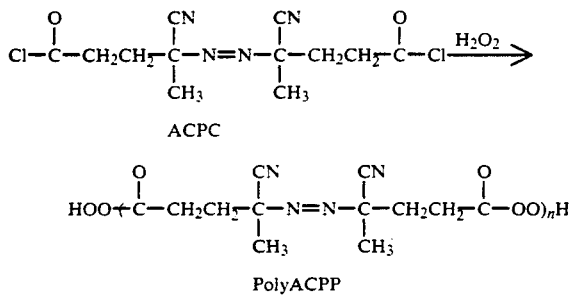

ACPC

PolyACPP

The resulting polymeric initiator, polyACPP, is verified by carbon 13 NMR spectroscopy. All polyACPP is end-caped with hydroperoxide groups. (Table II).

The molecular weight of the polymeric initiator is determined by Gel Permeation Chromatography. The results show that it contains mainly a mixture of mono-, di-, tri-, and tetra-mers and has a number average molecular weight of 600. The detailed synthesis procedure is described in the Example section.

It is to be understood that the above method of synthesis of the polymeric initiator does not limit the scope of the present invention.

The resulting polymeric initiator, polyACPP, may be used to initiate vinyl or allyl monomers which contain ethylenically unsaturated double bonds.

Characteristic monomers are shown below but are not exclusively limited thereto: (meth)acrylamide, (meth)acrylic acid, methyl acrylate, ethyl acrylate, butyl acrylate, 2-ethylhexyl acrylate, lauryl acrylate, stearyl acrylate, 2-hydroxyethyl acrylate, 2-hydroxypropyl acrylate, methyl methacrylate, ethyl methacrylate, butyl methacrylate, 2-ethylhexyl methacrylate, lauryl methacrylate, stearyl methacrylate, 2-hydroxyethyl methacrylate, 2-hydroxypropyl methacrylate, glycidyl methacrylate and other alkyl acrylate; 2-acrylamido-2-methylpropane sulfonic acid and its salt form; dimethylaminoethyl methacrylate, diethylaminoethyl acrylate, dimethylaminoethyl acrylate, diethylaminoethyl acrylate, N,N, dimethylpropylmethacrylamide, N,N,-dimethylpropylacrylamide, and the quaternized products of the tertiary amine compounds; styrene. vinybenzyl chloride, acrylonitrile, vinylidene cyanide, vinyl acetate, vinyl butyrate, vinyl stearate, vinyl toluene, vinyl pyridine, vinyl pyrrolidone; acids and their esters of maleic anhydride, fumaric acid; allyl compounds such as allyl chloride, allylamine, dimethyldiallyl ammonium halide, allyl hydroxypropyl sulfonate ether, 1-allyoxy-2-propanol, polyethyleneglycol allyl ether and mixtures thereof.

Since the polymeric initiator in this invention contains both peroxy and azo functional groups, having different thermal stability, the initiating groups can be selectively decomposed under selected conditions. This is extremely useful for producing block copolymers when two (or more) different monomers are used for polymerization. As a result, specific and unique water soluble homopolymers and block copolymers can be prepared using the novel polymeric initiator.

The block copolymerization is carried out in a two-stage process. First, the polymeric initiator is decomposed thermally, photochemically, or by a redox reaction to initiate the polymerization of the first monomer into a prepolymer containing another functional group available for further initiation. A second monomer is then added to the prepolymer and the copolymerization proceeds by decomposing the other functional group remaining in the prepolymer to form a block copolymer. Depending upon the type of monomer used, mechanism of termination, and polymerization conditions, the azo group or the peroxy group in the polymeric initiator can be activated first, followed by a second stage polymerization with the other monomer. The amount of the polymeric initiator added therein is from about 50 ppm to 10 percent by weight of the total monomers used. The polymerization may be conducted in solution, suspension, bulk or emulsion. In emulsion polymerization, a water-in-oil inverse emulsion technique as disclosed in U.S. Pat. Nos. Re. 28,474, and 28,576 is preferred. It is to be understood that the aforementioned polymerization methods do not in any way limit the synthesis of polymers according to this invention.

Any of the well known chain transfer agents familiar to those who skilled in the art may be used to control the molecular weight. Those include, but are not limited to, lower alkyl alcohols such as isopropanol, amines, mercaptans, and the like. Chelating agents such as ethylenediamine tetraacetic acid or diethylenetriamine pentaacetic acid and their salts may be added to chelate the metal ions in the system.

Accelerators such as bisulfite or ascorbic acid may also be used. Conventional initiators such as peroxide, persulfate, bromate, and azo compounds may also be added along with the polymeric initiator of this invention.

In this invention, a water-in-oil emulsion polymerization technique is used. An aqueous solution containing a monomer and a chelating agent is homogenized with an oil phase containing a liquid hydrocarbon, the polymeric initiator of this invention and at least one low HLB surfactant to form an emulsion. After the emulsion is prepared, polymerization is then initiated by adding a reducing agent to form a redox pair or by heat to induce the decomposition of the polymeric initiator in the emulsion. The temperature of the reaction medium is maintained at about 10° C. to about 80° C., preferably about 35° C. to about 60° C.

After the first polymerization is substantially completed, the second monomer solution is added to the emulsion. The emulsion is homogenized again, and the copolymerization proceeds by heating the emulsion to decompose the second functinal group (azo or peroxy) remaining in the (pre)polymer chain. Upon completion of the copolymerization, metabisulfite, sodium bisulfite or SO$_2$ gas may be further added to stabilize the emulsion and to react with any residual monomers. High HLB inverting surfactants such as those described in U.S. Pat. No. Re. 28,474 are then added to the emulsion to convert the resulting emulsion to a "self-inverting" emulsion. Using the procedure described herein, a unique block copolymer in emulsion form is obtained.

The resulting emulsion disperses and dissolves rapidly into an aqueous solution upon addition to water. Within minutes, a maximum solution viscosity is obtained. As shown in the Examples, the illustrated acrylamide/dimethylaminoethylmethacrylate methyl chloride (2-acryloyloxyethyltrimethylammonium chloride, AETAC) block copolymer is effective for sludge dewatering. Other acrylamide copolymers with dimethylaminoethylacrylate, diethylaminoethylacrylate, diethylaminoethylmethacrylate, dimethylaminopropylmethacrylamide, dimethylaminopropylacrylamide, and methyl chloride or dimethyl sulfate quaternary salts of the above compounds, and diallyl dimethyl ammonium chloride may be prepared in accordance with the invention for dewatering applications.

In addition, the acrylamide/dimethylaminoethylmethacrylate methyl chloride copolymer in this invention is found to be hydrolytically more stable than the random copolymers obtained using conventional initiators.

The obtained water soluble block copolymers have versatile applications. For instance, they can be used in other water treatment applications such as boiler, cooling tower, and gas scrubber to inhibit corrosion and control the formation and deposition of scale imparting compounds. Generally, anionic polymers and copolymers are used in these applications. Typical comonomers copolymerized with acrylic acid can be selected from acrylamide, methacrylic acid, maleic acid, itaconic acid, 2-acrylamido-2-methylpropane sulfonic acid, 1-allyl-2-hydroxyl propane sulfonic acid and their water-soluble salts thereof. Acrylate esters such as those disclosed in U.S. Pat. Nos. 4,288,327, 4,303,568, and 4,209,398 including: 2-hydroxyethyl (meth)acrylate, 2-hydroxypropyl (meth)acrylate, methyl methacrylate, etc., can also be used to copolymerize with acrylic acid.

The molecular weight of the copolymers described above may vary over a wide range, e.g., 1,000–30,000,000 and may be selected depending upon the desired application. The invention finds its greatest usefulness in sludge dewatering when the acrylamide copolymers have molecular weights in excess of 1,000,000. Whereas, acrylic acid copolymers with molecular weight of less than 30,000 are generally preferred when used as disperants for cooling, boiler, and gas scrubber systems.

There is no limit to the kind and mole percent of the monomers chosen so long as the total adds up to 100 mole % and the resulting polymers are water soluble.

EXAMPLES

The invention will now be further described with reference to a number of specific examples which are to be regarded solely as illustrative. and not as a restriction to the scope of the invention.

EXAMPLE 1

Synthesis of 4,4'-Azobis(4-cyanopentanoyl chloride)

To a mixture of 28.4 g of 4,4'azobis(4-cyanopentanoic acid) [ACPA], 1 ml of pyridine, and 200 ml of anhydrous ethyl ether was slowly added 100 ml of thionyl chloride over 2 hours at 0°–5° C. After the addition, the reaction mixture was stirred at room temperature for another 2 hours. The solvents were removed at reduced pressure and the resulting yellow powder was re-dissolved in an alcohol-free chloroform at 40° C. The chloroform solution was filtered to remove any unreacted ACPA and the filtrate was cooled to about 5° C. The resulting 4,4'-Azobis(4-cyanopentanoyl chloride) [ACPC] was crystallized and isolated by filtration followed by vacuum drying at room temperature.

The conversion of the carboxylic acid to the acid chloride was verified by Carbon 13 NMR (Table I) and FTIR (1795 cm$^{-1}$ for

TABLE I

Carbon 13 NMR data for ACPC $$\overset{O}{\underset{Cl}{\|}}-\overset{5}{C}-CH_2CH_2-\overset{CN}{\underset{CH_3}{\overset{|}{\underset{|}{C}}}}-N=N-\overset{CN}{\underset{CH_3}{\overset{|}{\underset{|}{C^4}}}}-CH_2CH_2-\overset{O}{\underset{|}{\overset{\|}{C}}}-Cl$$

1  2  3     6

| Chemical Shift in ppm | | | | | |
|---|---|---|---|---|---|
| Carbon Number | | | | | |
| 1 | 2 | 3 | 4 | 5 | 6 |
| 23.5 | 32.4 | 41.5 | 71.1 | 116.6 | 171.9 |

EXAMPLE 2

Synthesis of Poly[4,4'-azobis(4-cyanopentanoyl peroxide)], PolyACPP

The polymeric initiator was synthesized by an interfacial polycondensation of ACPC from Example 1 with hydrogen peroxide. The aqueous phase contained 15.0 g of sodium acetate and 4.1 g of 30% hydrogen peroxide in 50 ml of distilled deionized water. The organic phase was prepared by dissolving 10.0 g of [ACPC] from Example 1 in 100 ml of alcohol-free chloroform and followed by cooling to 0° C. The organic phase was slowly added into the aqueous phase over 20 min. at a temperature below 5° C. After the addition, the reaction mixture was stirred for another 40 min. at this temperature. The aqueous layer was discarded and the organic layer was washed with water and dried over anhydrous magnesium sulfate. The solids were filtered off and the filtrate was concentrated at reduced pressure to afford a yellowish paste which was verified as the PolyACPP by Carbon 13 NMR. (Table II). The Carbon 13 NMR also indicated that all the polymeric initiator chains were end-caped with hydroperoxide. Gel Permeation Chromatography showed that the products contained mainly mono-, di-, tri-, and tetra-mers and had a number average molecular weight of 600.

TABLE II

Carbon 13 NMR data for the title polymeric initiator $$\text{HOO} \overset{O}{\underset{1}{\overset{\|}{-C}}} \text{—CH}_2\text{CH}_2 \overset{CN}{\underset{\underset{CH_3}{|}}{\overset{|}{-C}}} \text{—N=N} \overset{CN}{\underset{\underset{CH_3}{|}}{\overset{|}{-C}}} {}^4 \text{—CH}_2\text{CH}_2 \overset{O}{\underset{6}{\overset{\|}{-C}}} \text{—OO} \overset{}{\underset{}{\rightarrow_n}} \text{H}$$

| Chemical Shift in ppm Carbon Number | | | | | |
|---|---|---|---|---|---|
| 1 | 2 | 3 | 4 | 5 | 6 |
| 21.9 | 25.0 | 28.5 | 71.3 | 117.1 | 165.6 |
| 23.4 | 29.9 | 32.3 | — | — | 167.0 |

EXAMPLE 3

Azo-Containing Polyacrylamide (PAM)

A resin kettle equipped with a condenser, a thermometer, a nitrogen gas inlet, and a mechanical stirrer was charged with 8.09 g of sorbitan sesquioleate (ARACEL ® 83), available from ICI, 2.02 g of polyoxyethylene sorbitan hexaoleate (G-1086), available from ICI, 250 g of a low volatile aliphatic oil (SOLTROL ® 145, available from Phillips Petroleum), and a solution of 0.1 g of the polymeric initiator of example 2 in 1.6 g of tetrahydrofuran (THF).

Separately, in a 600 ml beaker was charged 250 g of 50% acrylamide solution, 166 g of deionized water, and 0.5 g of a chelating agent, VERSENEX ® 80, available from Dow Chemical, which is an 80% solution of the pentasodium salt of diethylene triamine pentacetic acid. The solution was well mixed and its pH was adjusted to 4.5 with sulfuric acid.

The monomer solution was added to the oil phase and homogenized with a Silverson homogenizer to give a stable emulsion. The emulsion was sparged with nitrogen for 30 minutes and then cooled to 10° C. A sodium metabisulfite solution (0.2 g in 20 g of water) was slowly added to the emulsion. The polymerization was carried out at a temperature below 40° C. A total of 4.62 ml of sodium metabisulfite solution was added in 1 h. The emulsion was stirred for another 30 min. The UL viscosity of the resulting polymer was determined using the following method:

An aliquot of emulsion was added to 250 g of 4% sodium chloride solution and 0.5 g of SURFONIC ® N-95, available from Texaco (alkyl aryl polyether alcohol) under aggitation (600 RPM) to make up a solution containing 0.3% (w/w) of solids. The emulsion usually inverted to an aqueous solution within a couple of minutes. However, the mixture was agitated for 30 minutes and the viscosity (UL viscosity) was determined with a Brookfield viscometer using an UL adaptor at 12 RPM.

The resulting polymer of this example had an UL viscosity of 24.7 cps.

EXAMPLE 4

Preparation of Acrylamide/2-Acryloyloxyethyltrimethylamonium Chloride (AETAC)

Block Copolymer Using Azo-Containing PAM of Example 3

A reaction kettle was charged with 400 g of Example 3, a solution of 8.11 g of G-1086 in 20 g of Soltrol 145 and 168.5 g of AETAC monomer solution (79.2% aqueous solution). The mixture was homogenized, purged with nitrogen, and the copolymerization was carried out at 70° C. for 4 hours. High HLB inverting surfactants (about 2 wt %) were then added to the product to give a "self-inverting" emulsion containing the title block copolymer with an UL viscosity of 14.7 cps. The following Table shows the charges for Example 3 and 4.

TABLE III

| | Recipe for Example 4 | |
|---|---|---|
| | PAM (based on 400 g) | AM/AETAC Block |
| Oil Phase | | |
| Arlacel 83 | 4.72 | — |
| G-1086 | 1.17 | 8.11 |
| Example 2 Polymeric Initiator | 0.06 | — |
| THF | 1.00 | — |
| Soltrol 145 | 146.30 | 20.00 |
| Aqueous Phase | | |
| 50% Acrylamide | 146.50 | — |
| 79.2% AETAC | — | 168.50 |
| D.I. Water | 97.00 | — |
| Versenex 80 | 0.30 | — |
| Na2S2O5 Solution | 2.70 | — |

EXAMPLE 5

Acrylamide/AETAC Block Copolymer Preparation

The procedures of Examples 3 and 4 were repeated except that in the synthesis of azo-containing PAM, the reaction temperature was allowed to rise to 50° C. through exotherm of polymerization and maintained thereafter in the range of 48° to 53° C. The following Table summarizes the charges.

TABLE IV

| | Recipe for Example 5 | |
|---|---|---|
| | PAM (based on 400 g) | AM/AETAC Block |
| Oil Phase | | |
| Arlacel 83 | 4.69 | — |
| G-1086 | 1.18 | 8.10 |
| Example 2 Polymeric Initiator | 0.05 | — |
| THF | 0.28 | — |
| Soltrol 145 | 146.41 | 20.00 |
| Aqueous Phase | | |
| 50% Acrylamide | 146.53 | — |
| 79.2% AETAC | — | 168.51 |
| D.I. Water | 97.53 | — |
| Versenex 80 | 0.29 | 0.30 |
| Na2S2O5 Solution | 2.93 | — |

EXAMPLE 6

Azo-Containing Poly(acrylamide) via Thermal Polymerization

Instead of re-dox polymerization, acrylamide was thermally polymerized in this Example. Since the acyl peroxide has a lower thermal stability than the azo, an azo-containing PAM can be prepared by polymerizing AM at a temperature high enough to decompose the acyl peroxide while low enough to keep the azo intact.

The procedure used to prepare the monomer emulsion in Example 3 was used here. After the monomer emulsion (Table V) was homogenized and purged with nitrogen, the polymerization was carried out at 55°–60° C. for 4 hours to afford a stable white polymer emulsion with an UL viscosity of 42.2 cps.

EXAMPLE 7

Synthesis of AM/AETAC Block Copolymer using Azo-Containing PAM of Example 6

The procedure used in Example 4 was repeated. The azo groups of the poly(acrylamide) prepared in Example 6 was thermally decomposed to initiate the polymerization of AETAC. After a 4 hour polymerization at 70° C., a stable emulsion with an UL viscosity of 14.7 cps was obtained. The following Table shows the charges used in both Examples 6 and 7.

TABLE V

| Recipe for Example 7 | | |
|---|---|---|
| | PAM (based on 400 g) | AM/AETAC Block |
| Oil Phase | | |
| Arlacel 83 | 4.72 | — |
| G-1086 | 1.19 | 8.11 |
| Example 2 Polymeric Initiator | 0.029 | — |
| THF | 0.96 | — |
| Soltrol 145 | 147.30 | 20.00 |
| Aqueous Phase | | |
| 50% Acrylamide | 147.50 | — |
| 79.2% AETAC | — | 169.20 |
| D.I. Water | 98.00 | — |
| Versenex 80 | 0.30 | — |

EXAMPLE 8

Acrylamide/N,N-dimethylacrylamide(DMAM) Block Copolymer

Similar procedures used in Examples 3 and 4 were used here except the additional G-1086 used for the block copolymerization was directly added without dissolving in Soltrol 145 prior to the addition. Table VI shows the charge of the reagents. The UL viscosity of the resulting polymer was 16.7 cps.

TABLE VI

| Recipe for Example 8 | | |
|---|---|---|
| | PAM | AM/DMAM Block |
| Oil Phase | | |
| Arlacel 83 | 4.57 | 3.58 |
| G-1086 | 0.69 | 0.53 |
| Example 2 Polymeric Initiator | 0.018 | — |
| THF | 0.09 | — |
| Soltrol 145 | 118.50 | — |
| Aqueous Phase | | |
| 50% Acrylamide | 111.69 | — |
| D.I. water | 72.22 | — |
| DMAM | — | 33.64 |
| Versenex 80 | 0.24 | — |
| Sodium metabisulfite solution | 2.00 | — |

EXAMPLE 9

Acrylamide/Acrylic Block Copolymer

The poly(acrylamide) emulsion was prepared as described in Example 8. Acrylic acid (AA) was neutralized with 50% caustic at a temperature below 40° C. After additional emulsifiers (Table VII) were added to the poly(acrylamide) emulsion and dispersed, the acrylic acid solution was added and homogenized. The polymerization was carried out at 65° C. for 3 hours to yield the title block copolymer with an UL viscosity of 4.6 cps.

TABLE VII

| Recipe for Example 9 | | |
|---|---|---|
| | PAM | AM/AA block |
| Oil Phase | | |
| Arlacel 83 | 4.67 | 0.50 |
| G-1086 | 1.18 | 6.32 |
| Example 2 Polymeric Initiator | 0.023 | — |
| THF | 0.12 | — |
| Soltrol 145 | 145.70 | — |
| Aqueous Phase | | |
| 50% Acrylamide | 145.80 | — |
| Acrylic acid | — | 31.17 |
| 50% Caustic | — | 32.09 |
| D.I. water | — | 202.00 |
| Versenex 80 | 0.31 | — |
| Sodium metabisulfite solution | 2.07 | — |

EXAMPLE 10

Acrylamide/2-Acrylamido-2-methyl-1-propanesulfonic acid (available from Lubrizol) Block Copolymer The procedure used in Example 9 was repeated except the polymerization was carried out for an additional hour at 70° C. after 3 hours at 65° C. The following Table shows the formulation for the polymerization. UL viscosity of the resulting copolymer was 7.0 cps.

TABLE VIII

| Recipe for Example 10 | | |
|---|---|---|
| | PAM | AA/AMPS Block |
| Oil Phase | | |
| Arlacel 83 | 3.89 | 0.43 |
| G-1086 | 0.99 | 5.25 |
| Example 2 Polymeric Initiator | 0.02 | — |
| THF | 0.10 | — |
| Soltrol 145 | 121.47 | — |
| Aqueous Phase | | |
| 50% Acrylamide | 121.54 | — |
| 45% AMPS ® | — | 169.07 |
| Make-up D.I. water | — | 15.00 |
| Versenex 80 | 0.26 | — |
| Sodium metabisulfite solution | 1.73 | — |

Sludge Dewatering Activity Test

The block copolymers were evaluated in a sludge dewatering application for wastewater treatment. One commonly used method to gauge sludge dewatering efficacy is the Capillary Suction Time test (CST).

In the CST test, an aliquot of sludge is placed in a cylindrical cell which is placed on top of a piece of chromatography paper. The capillary pressure exerted by the paper draws the water out of the sludge. A timer records the time (in seconds) required for the water to pass between two fixed points. Shorter times indicate better dewatering efficacy. Results are evaluated by preparing a graph of CST versus treatment dosage. Generally, the treatment which produces the lowest CST value at the lowest dosage is the most effective.

Sludges taken from a refinery and a papermill, separately, were used for this evaluation. The results appear in FIGS. 1 and 2 and the data used to generate the figures are shown in Tables IX and X, respectively.

TABLE IX

CST Results
Sludge from a refinery in Texas

| Treatment | Polymer Dosage ppm solids | Capillary Suction Time Seconds |
| --- | --- | --- |
| Example 4 Copolymer | 38.2 | 66.9 |
|  | 76.3 | 28.9 |
|  | 114.5 | 7.5 |
|  | 152.6 | 6.5 |
|  | 190.8 | 8.3 |
|  | 228.9 | 23.6 |
| Example 5 Copolymer | 36.6 | 90.9 |
|  | 72.5 | 50.4 |
|  | 108.8 | 10.6 |
|  | 145.0 | 5.9 |
|  | 181.3 | 5.1 |
|  | 217.5 | 9.7 |
| Example 7 Copolymer | 38.3 | 67.6 |
|  | 76.5 | 29.5 |
|  | 114.8 | 8.3 |
|  | 153.1 | 6.3 |
|  | 191.4 | 8.8 |
|  | 229.6 | 14.0 |
| Comparative Example A* | 42.7 | 57.8 |
|  | 85.4 | 23.7 |
|  | 128.1 | 6.9 |
|  | 170.8 | 4.7 |
|  | 213.5 | 7.5 |
|  | 256.2 | 21.4 |

*Commercial sample from Cyanamid. MAGNIFLOC ® 1596C, a high molecular weight random acrylamide/AETAC copolymer at 40 mole % AETAC.

TABLE X

CST Results
Sludge from a paper mill in Ohio

| Treatment | Polymer Dosage ppm solids | Capillary Suction Time Seconds |
| --- | --- | --- |
| Example 5 Copolymer | 18.1 | 70.1 |
|  | 36.3 | 41.8 |
|  | 72.5 | 22.8 |
|  | 108.8 | 13.6 |
|  | 145.0 | 12.3 |
|  | 181.3 | 12.4 |
|  | 199.4 | 11.6 |
|  | 217.5 | 11.8 |
|  | 235.6 | 12.4 |
|  | 253.8 | 14.2 |
|  | 290.0 | 15.7 |
| Example 8 Copolymer | 18.6 | 82.0 |
|  | 37.2 | 77.6 |
|  | 74.3 | 61.3 |
|  | 111.5 | 54.2 |
|  | 148.7 | 41.8 |
|  | 185.8 | 33.0 |
|  | 223.0 | 16.0 |
|  | 241.6 | 14.3 |
|  | 260.2 | 11.7 |
|  | 278.8 | 11.1 |
|  | 297.3 | 17.2 |
| *Comparative Example A | 21.4 | 85.0 |

TABLE X-continued

CST Results
Sludge from a paper mill in Ohio

| Treatment | Polymer Dosage ppm solids | Capillary Suction Time Seconds |
| --- | --- | --- |
|  | 42.7 | 63.8 |
|  | 85.4 | 42.4 |
|  | 128.1 | 18.8 |
|  | 170.8 | 11.5 |
|  | 213.5 | 9.1 |
|  | 256.2 | 10.1 |
|  | 298.9 | 22.5 |
|  | 341.6 | 29.8 |

*Commercial sample from Cyanamid. MAGNIFLOC ® 1596C.

The results demonstrate that the copolymers produced according to this invention are quite effective as compared to commercially available material in sludge dewatering applications.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A method of dewatering aqueous sludge comprising adding to said sludge a water soluble block copolymer having repeat units comprising ethylenically unsaturated vinyl monomers selected from the group consisting of (meth)acrylamide, (meth)acrylic acid and its salts, N,N'-dimethyl acrylamide, 2-acrylamido-2-methylpropane sulfonic acid and its salts; dimethylaminoethyl methacrylate, diethylaminoethyl acrylate, dimethylaminoethyl acrylate, diethylaminoethyl acrylate, N,N'-dimethylpropylmethacrylamide, N,N'-dimethylpropylacrylamide, and their methyl chloride or methyl sulfate quaternaries or mixtures thereof, initiated by a compound having the formula:

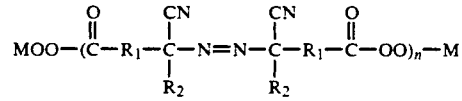

wherein M is hydrogen or a water soluble cation, $R_1$ is a linear or branched lower alkylene group having from about 1 to 8 carbon atoms, $R_2$ is hydrogen or a lower alkyl group having from about 1 to 5 carbon atoms and n is from 1 to 10 wherein said water soluble block copolymer has a molecular weight in excess of 1,000,000.

2. A method according to claim 1, wherein M is hydrogen, $R_1$ is ethylene, $R_2$ is methyl and n is from 1 to 10.

3. A method according to claim 1, wherein M is hydrogen, $R_1$ is ethylene, $R_2$ is methyl and n is from 1 to 4.

4. A method according to claim 1 wherein said water soluble block copolymer is added to a wastewater treatment system.

* * * * *